US012805991B2

(12) United States Patent
Gottenbos et al.

(10) Patent No.: US 12,805,991 B2
(45) Date of Patent: Nov. 24, 2026

(54) CLEANING DEVICE USING LIQUID SHEET CLEANING ACTION

(71) Applicant: KONINKLIJKE PHILIPS N.V., Eindhoven (NL)

(72) Inventors: Bart Gottenbos, Budel (NL); Valentina Lavezzo, Heeze (NL); Quintin Oliver Williams, Eindhoven (NL); Sandra Hötzl, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/757,122

(22) PCT Filed: Oct. 16, 2018

(86) PCT No.: PCT/EP2018/078196

§ 371 (c)(1),
(2) Date: Apr. 17, 2020

(87) PCT Pub. No.: WO2019/081268

PCT Pub. Date: May 2, 2019

(65) Prior Publication Data

US 2020/0237489 A1 Jul. 30, 2020

Related U.S. Application Data

(60) Provisional application No. 62/575,587, filed on Oct. 23, 2017.

(51) Int. Cl.
*A61C 17/02* (2006.01)

(52) U.S. Cl.
CPC ...... *A61C 17/0202* (2013.01); *A61C 17/0217* (2013.01)

(58) Field of Classification Search
CPC .. A61C 17/0202; A61C 17/0217; A61C 17/02
(Continued)

(56) References Cited

U.S. PATENT DOCUMENTS 3,756,225 A * 9/1973 Moret .................. A61C 17/028 601/163
3,870,039 A 3/1975 Moret et al.
(Continued)

FOREIGN PATENT DOCUMENTS

DE 3526579 A1 7/1986
JP H0388891 U 9/1991
(Continued)

OTHER PUBLICATIONS

Translation of JP 4917217 (Year: 2012).*
International Search Report and Written Opinion, International Application No. PCT/EP2018/078196, Mailed on Jan. 16, 2019.

*Primary Examiner* — Yogesh P Patel

(57) ABSTRACT

A cleaning device (10) comprising: a body portion (12); a nozzle member (14) mounted on the body portion and comprising a nozzle head (16), wherein the nozzle member is configured to allow passage of liquid and/or air from a reservoir in the body to the nozzle head; and an orifice (40) in the nozzle head configured to allow the liquid and/or air to exit the nozzle head, wherein the orifice is configured to shape the exiting liquid and/or air into at least one liquid sheet having a length greater than a width at a target cleaning distance.

17 Claims, 11 Drawing Sheets

(58) Field of Classification Search
USPC ......... 239/601, 597, 598, 599, 561; 222/575
See application file for complete search history.

(56) References Cited

U.S. PATENT DOCUMENTS

| | | | | | |
|---|---|---|---|---|---|
| 5,951,284 | A * | 9/1999 | Lake | A61B 1/253<br>433/31 |
| 6,149,429 | A * | 11/2000 | Bukowski | A61C 17/0202<br>433/80 |
| 6,413,086 | B1 * | 7/2002 | Womack | A61C 19/04<br>33/513 |
| 2003/0013063 | A1 * | 1/2003 | Goldman | A61C 3/025<br>601/162 |
| 2006/0097084 | A1 | 5/2006 | Gromer et al. | |
| 2010/0304327 | A1 | 12/2010 | Grez et al. | |
| 2012/0021371 | A1 | 1/2012 | Gromer et al. | |
| 2012/0118998 | A1 | 5/2012 | Drechsel | |
| 2013/0323684 | A1 | 12/2013 | Monty et al. | |
| 2014/0127641 | A1 | 5/2014 | Hilscher et al. | |
| 2015/0282908 | A1 * | 10/2015 | Wada | A61C 17/0202<br>433/89 |
| 2016/0310247 | A1 * | 10/2016 | Wang | A61C 17/0217 |
| 2016/0331117 | A1 * | 11/2016 | Follows | A61C 17/221 |
| 2017/0224452 | A1 | 8/2017 | Chang | |
| 2018/0344441 | A1 | 12/2018 | Dorward | |
| 2019/0000599 | A1 | 1/2019 | Hanuschik | |

FOREIGN PATENT DOCUMENTS

| | | | | |
|---|---|---|---|---|
| JP | 2001293014 | A | 10/2001 | |
| JP | 2003203884 | A | 7/2003 | |
| JP | 4917217 | B2 * | 4/2012 | |
| JP | 2015002857 | A | 1/2015 | |
| WO | WO-2005117744 | A2 * | 12/2005 | A61C 19/04 |
| WO | 2014121293 | A1 | 8/2014 | |
| WO | 2015168329 | A1 | 11/2015 | |
| WO | 2015173698 | A1 | 11/2015 | |
| WO | 2015173699 | A1 | 11/2015 | |
| WO | WO-2019006403 | A1 * | 1/2019 | A46B 11/00 |

* cited by examiner

CLEANING DEVICE USING LIQUID SHEET CLEANING ACTION

This application is the U.S. National Phase application under 35 U.S.C. § 371 of International Application No. PCT/EP2018/078196, filed on 16 Oct. 2018, which claims the benefit of U.S. Provisional Application No. 62/575,587, filed 23 Oct. 2017. These applications are hereby incorporated by reference herein.

FIELD OF THE INVENTION

The present disclosure is directed generally to personal care devices and methods using liquid sheet cleaning action.

BACKGROUND

Proper personal hygiene can help improve health and reduce issues with disease, infection and other health issues. For example, proper tooth cleaning helps promote long-term dental health. One facet of proper tooth cleaning is the use of oral irrigators to remove dental plaque to clean gums and teeth. Oral irrigators are especially important in areas where toothbrushes cannot easily access, such as between the teeth and at the gum margin. The cleaning force of the water pressure provided by the oral irrigator or other personal care cleaning device can be problematic, as increasing the driving pressure reduces the comfort of the water jet. If a user experiences discomfort, they may discontinue use of the product; alternatively, if the water pressure is not sufficient, it will not provide adequate cleaning.

Personal care cleaning devices, such as oral irrigators typically comprise one or more rounded orifices that project a rounded stream or "jet" of water toward the surface to be cleaning. Although there are some variations on rounded orifices, the resulting jets are typically round or oval in shape.

Accordingly, there is a continued need in the art for personal care cleaning devices that exert sufficient force to remove unwanted substances, such as plaque layers from dental surfaces without being uncomfortable or dangerous for the user.

SUMMARY OF THE INVENTION

The present disclosure is directed to inventive methods and systems for cleaning using personal care cleaning device that produces liquid sheets. Various embodiments and implementations herein are directed to a personal care cleaning device configured with an orifice or orifices that emit one or more liquid sheets under pressure toward the surface to be cleaned, either alone or in conjunction with one or more liquid jets exerted under pressure toward the surface. The liquid sheets are characterized as a water stream having an elongated shape, where the length is substantially longer than the width, as described herein. Liquid sheets result in superior substance removal over circular water jets at the same driving pressure, especially when impacting at steep impact angles. For example, the personal care cleaning device can be an oral irrigator configured to clean the teeth and gums, including the interproximal spaces.

Generally in one aspect, a personal care cleaning device is provided. The cleaning device includes a body portion, a nozzle member mounted on the body portion and comprising a nozzle head, wherein the nozzle member is configured to allow passage of liquid and/or air from a reservoir in the body to the nozzle head, and an orifice in the nozzle head configured to allow the liquid and/or air to exit the nozzle head, wherein the orifice is configured to shape the exiting liquid and/or air into at least one sheet comprising a length greater than its width at a position of impact on a surface to be cleaned.

According to an embodiment, the cleaning device further includes a second orifice in the nozzle head configured to allow the liquid and/or air to exit the nozzle head, wherein the second orifice is circular.

According to an embodiment, the orifice is configured to shape the exiting liquid and/or air into a plurality of liquid sheets.

According to an embodiment, the orifice is configured such that the length of the liquid sheet at the position of impact on the surface to be cleaned is configured to be approximately the average height of a surface to be cleaned, such as, e.g., the height of a tooth. According to an embodiment, the length of the liquid sheet at the position of impact on the surface to be cleaned is between approximately 2 to 15 mm. According to an embodiment, the width of the liquid sheet at the position of impact on the surface to be cleaned is between approximately 0.01 to 0.25 mm.

According to an embodiment, the nozzle head comprises a plurality of orifices, each comprising a different shape.

According to an embodiment, the nozzle member is removably mounted on the body portion.

According to an embodiment, the personal care cleaning device is an oral irrigator.

Generally, in another aspect, a cleaning device is provided. The cleaning device includes a body portion; a nozzle member mounted on the body portion and comprising a nozzle head, wherein the nozzle member is configured to allow passage of liquid and/or air from a reservoir in the body to the nozzle head; and a first orifice in the nozzle head configured to allow the liquid and/or air to exit the nozzle head, wherein the first orifice is rectangular, triangular, or star-shaped, and wherein the first orifice is configured to emit both a jet of liquid and/or air, and a sheet of liquid and/or air.

According to an embodiment, the first orifice is star-shaped and comprises 3, 4, 5, or 6 points.

According to an embodiment, the rectangular, triangular, or star-shaped orifice comprises an area of approximately 0.1 to 2 $mm^2$.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a device comprising an orifice configured to emit a liquid sheet. More generally, applicant has recognized and appreciated that it would be beneficial to provide a method or system to clean surfaces using a liquid sheet cleaning action. Accordingly, described or otherwise envisioned herein is a personal care cleaning device configured to emit one or more liquid sheets to clean body surfaces. The cleaning device comprises one or more nozzles or orifices configured to emit one or more liquid sheets. According to an embodiment, the cleaning device may further comprise one or more nozzles and/or orifices configured to simultaneously or intermittently emit a liquid jet to further enhance cleaning. According to an embodiment, the personal care cleaning device is an oral irrigator configured to clean the teeth and gums, including the interproximal spaces.

The embodiments and implementations disclosed or otherwise envisioned herein can be utilized with any personal care cleaning device, including but not limited to an oral irrigator, toothbrush, a flossing device, a wound cleaning device, skin cleaning device, a device comprising both a toothbrush and an oral irrigator, or any other cleaning device. However, the disclosure is not limited to an oral irrigator and thus the disclosure and embodiments disclosed herein can encompass any personal care cleaning device.

Figure 1:
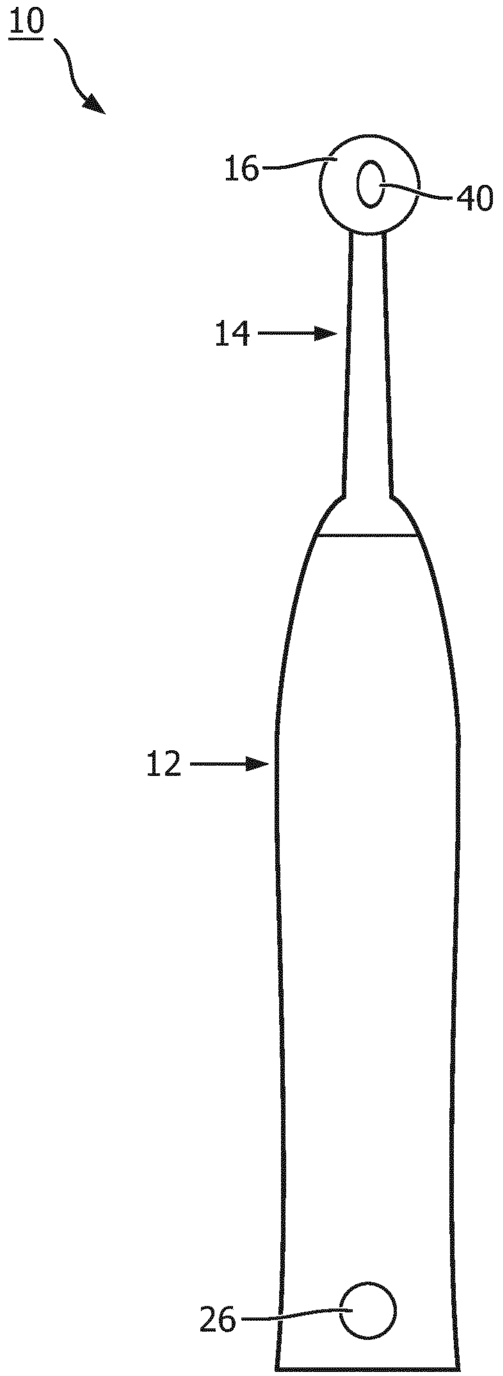
FIG. 1 is a schematic representation of a personal care cleaning device, in accordance with an embodiment.

Referring to FIG. 1, in one embodiment, is a personal care cleaning device 10 with a body portion 12 and a nozzle member 14 mounted on the body portion. Nozzle member 14 includes at its end remote from the body portion a head 16. Head 16 comprises an orifice 40 configured to emit liquid and/or air from the device. According to an embodiment, nozzle member is configured to allow the passage of pressurized liquid and/or air from a fluid reservoir (not shown) out of the orifice 40, where it is applied to the user's dental surfaces. Nozzle member 14 can be detachably mounted onto body portion 12 such that the nozzle can periodically be replaced with a new one when a component of the device is worn out or otherwise requires replacement, such as nozzle members with varying orifices 40 for different functions.

Body portion 12 is further provided with a user input 26. The user input 26 allows a user to operate the personal care cleaning device 10, for example to turn the device on and off or initiate a cleaning session. The user input 26 may, for example, be a button, touch screen, or switch.

Figure 2A:
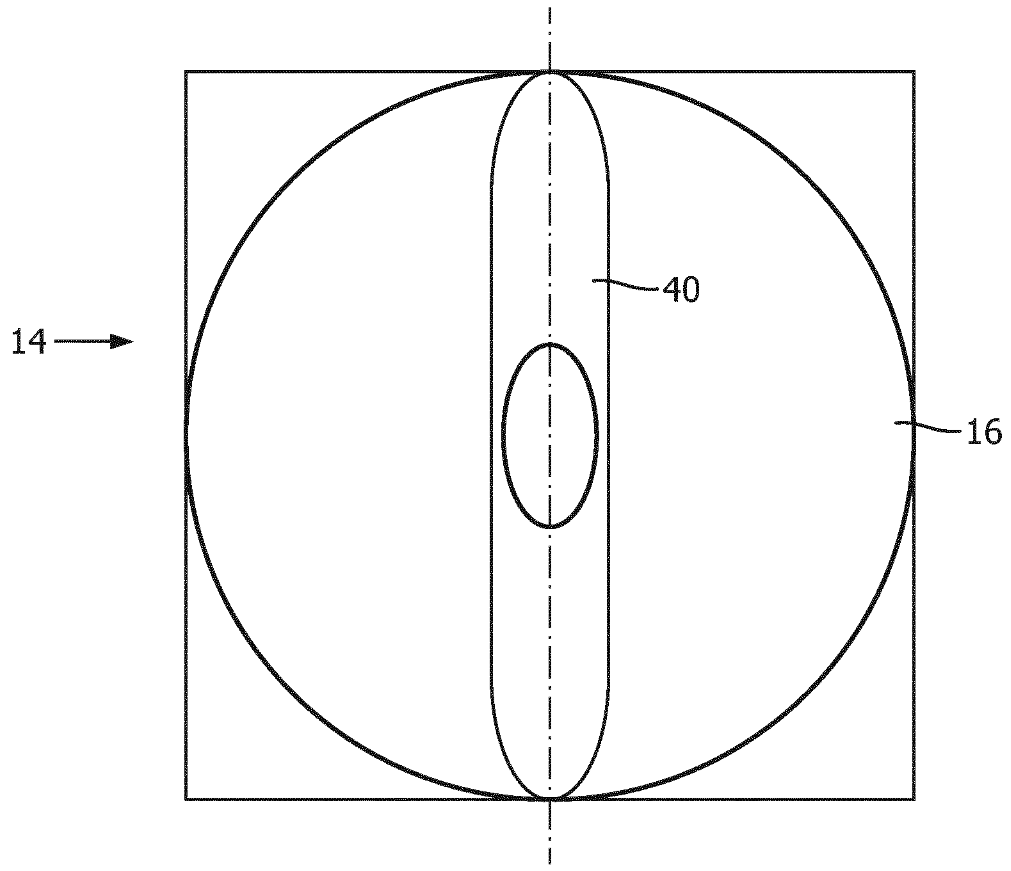
FIG. 2A is a schematic representation of a head of a cleaning device, in accordance with an embodiment.
Figure 2B:
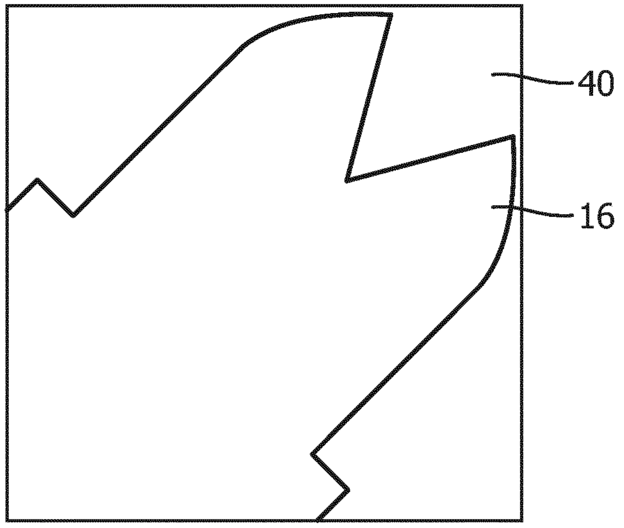
FIG. 2B is a schematic representation of a head of a cleaning device, in accordance with an embodiment.

Referring to FIGS. 2A and 2B, in one embodiment, is a nozzle of a personal care cleaning device. The nozzle includes a nozzle head 16 with one or more orifices 40 configured to emit a liquid for cleaning. FIG. 2A is a front view of a nozzle head 16 with an orifice 40, and FIG. 2B is a cutaway side view of the nozzle head with orifice 40. The orifice may comprise many different shapes and sizes as described or otherwise envisioned herein. Although not shown in FIG. 2A or 2B, orifice 40 is in liquid communication with a passage within nozzle head 16 and nozzle member 14 that allows the transfer of pressurized liquid and/or air from a reservoir (not shown) to the nozzle head, where it is applied to one or more surfaces.

According to an embodiment, a liquid sheet can be defined as a shape that has a cross-section in which the length is longer than the width. A liquid sheet embodies a higher cleaning force, which may result from a steeper pressure gradient due of the thinner dimension, combined with a two-directional outflow compared to radial outflow in round jets. Additionally, the liquid sheet has the additional advantage of a much larger treatment area over round jets as the personal care cleaning device is moved across the surface to be cleaned.

According to an embodiment, when the personal care cleaning device is an oral cleaning device, the length of the one or more liquid sheets impacting the teeth is configured to approximate the height of teeth, as excess length above the height of teeth would waste liquid. As just one example, the total useful length of the one or more liquid sheets impacting the teeth could be approximately 2 to 15 mm, and most commonly may be 5 to 10 mm, although many other sizes are possible. Typical oral irrigators have a cross-sectional area of the orifice of about 0.5 $mm^2$ ranging from about 0.1 to 2 $mm^2$. The sheets clean well, for example, when having a width of approximately 0.1 mm or less, possibly ranging from 0.01 to 0.3 mm, although many other sizes are possible.

Figure 3A:
FIG. 3A is a schematic representation of a sheet impact shape at a surface to be cleaned, originating from the head of a cleaning device, in accordance with an embodiment.
Figure 3B:
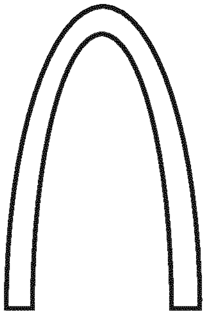
FIG. 3B is a schematic representation of a sheet impact shape at a surface to be cleaned, originating from the head of a cleaning device, in accordance with an embodiment.
Figure 3C:
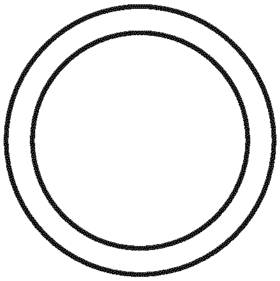
FIG. 3C is a schematic representation of a sheet impact shape at a surface to be cleaned, originating from the head of a cleaning device, in accordance with an embodiment.
Figure 3D:
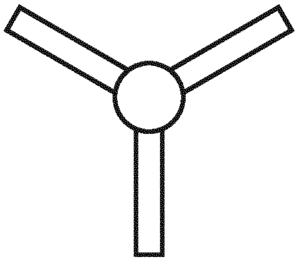
FIG. 3D is a schematic representation of a sheet impact shape at a surface to be cleaned, originating from the head of a cleaning device, in accordance with an embodiment.
Figure 3E:
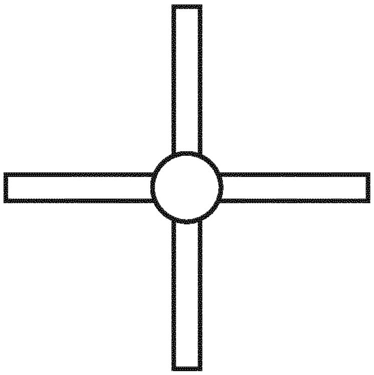
FIG. 3E is a schematic representation of a sheet impact shape at a surface to be cleaned, originating from the head of a cleaning device, in accordance with an embodiment.
Figure 3F:
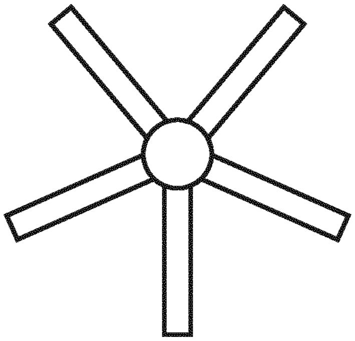
FIG. 3F is a schematic representation of a sheet impact shape at a surface to be cleaned, originating from the head of a cleaning device, in accordance with an embodiment.

Referring to FIGS. 3A-3F are various embodiments of the liquid impact profile on the surface to be cleaned, including a single straight sheet (FIG. 3A), a half oval sheet (FIG. 3B), a circular sheet (FIG. 3C), and a variety of star shapes combining a central jet with radially extending sheets (FIGS. 3D-3E). These impact shapes may be used alone or in conjunction. Different orifices produce different sheet morphologies, and one morphology may be more efficient at cleaning a certain type of surface versus another morphology.

Figure 4:
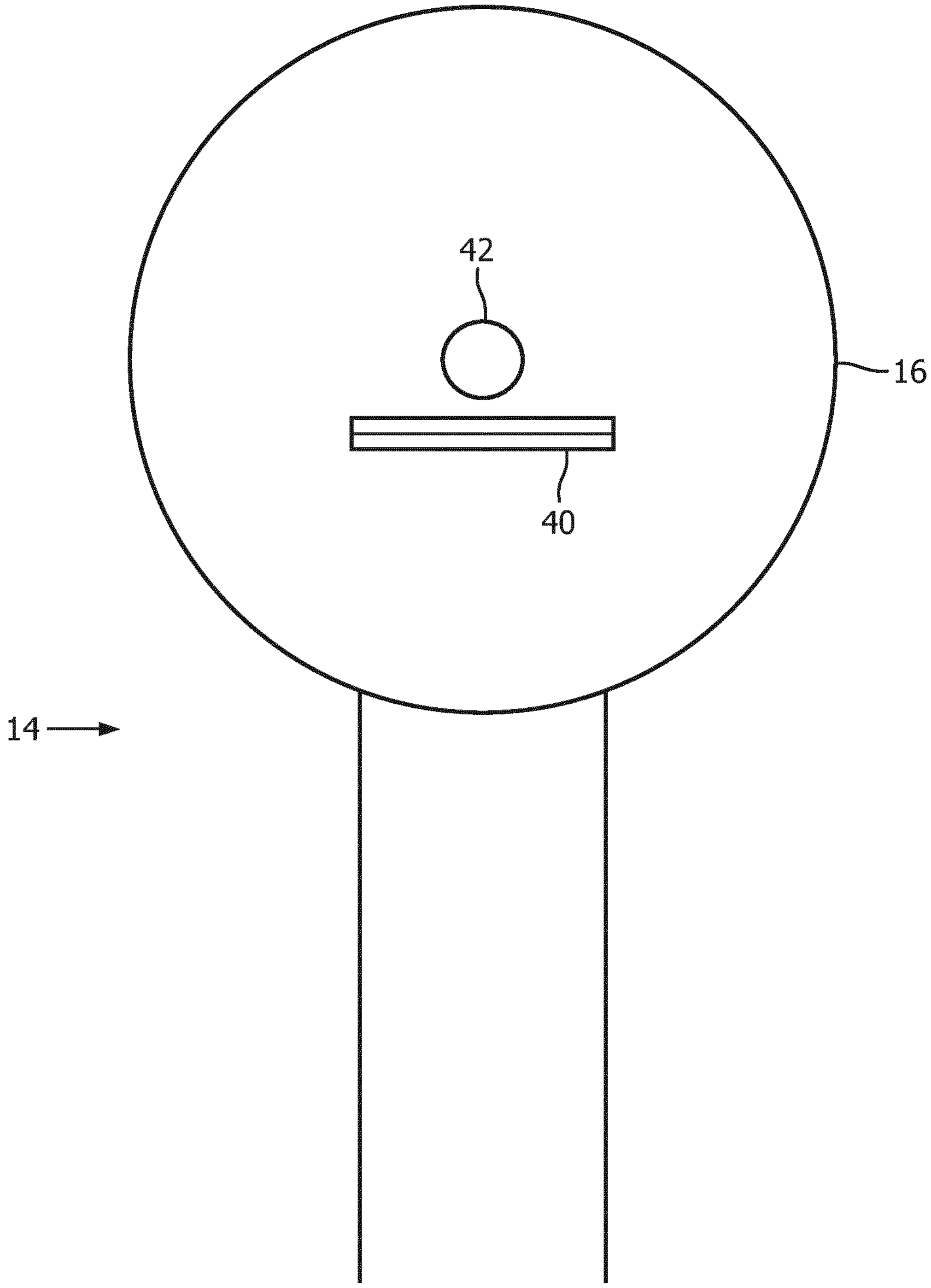
FIG. 4 is a schematic representation of a head of a cleaning device, in accordance with an embodiment.

Referring to FIG. 4, in one embodiment, is a nozzle 14 of a personal care cleaning device. The nozzle includes a nozzle head 16 with multiple orifices configured to emit a liquid for cleaning. In this embodiment, the nozzle head comprises both liquid sheet orifice 40, and a centralized orifice 42 configured to emit a liquid jet. Similar to the embodiment depicted in FIGS. 2A and 2B, orifice 40 comprises a V-groove elliptical shape configured to emit a pressurized sheet of liquid from the liquid reservoir.

According to an embodiment, nozzle 14 of a personal care cleaning device 10 may comprise multiple different orifices configured to emit a liquid for cleaning, such as an elongated orifice, a star-shaped orifice with any number of points, a triangular orifice, a heart-shaped orifice, a half-oval orifice, and/or a variety of other shapes.

Figure 5A:
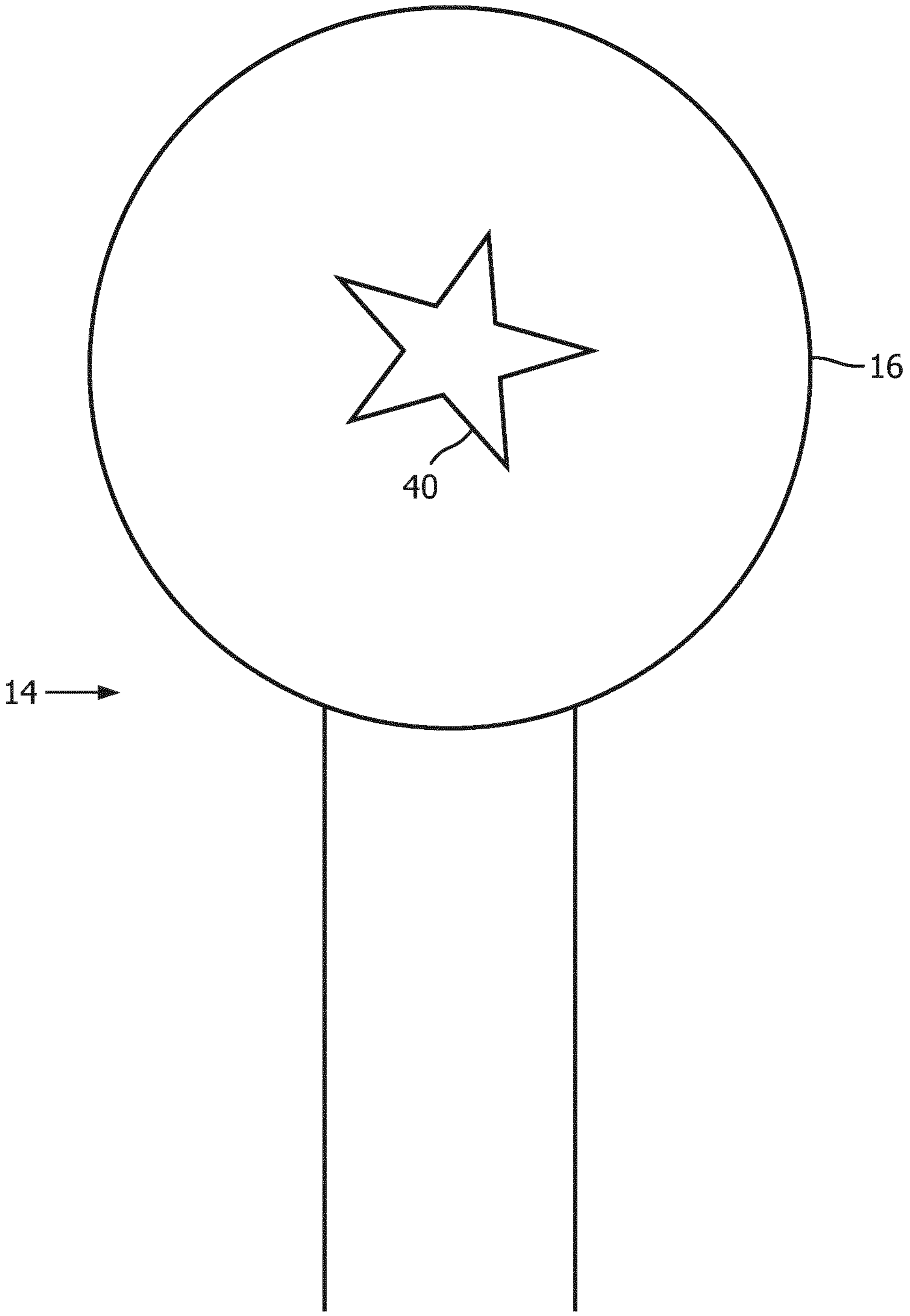
FIG. 5A is a schematic representation of a head of a cleaning device, in accordance with an embodiment.

Referring to FIG. 5A, in one embodiment, is a nozzle 14 of a personal care cleaning device comprising a nozzle head 16 with a star-shaped orifice 40. Due to the shape of the orifice and the liquid dynamics associated with the shape, star-shaped orifice 40 emits both liquid sheets and liquid jets. Although shown as a 5-pointed star, the orifice may comprise 3 points, 4 points, 5 points, or more points.

Figure 5B:
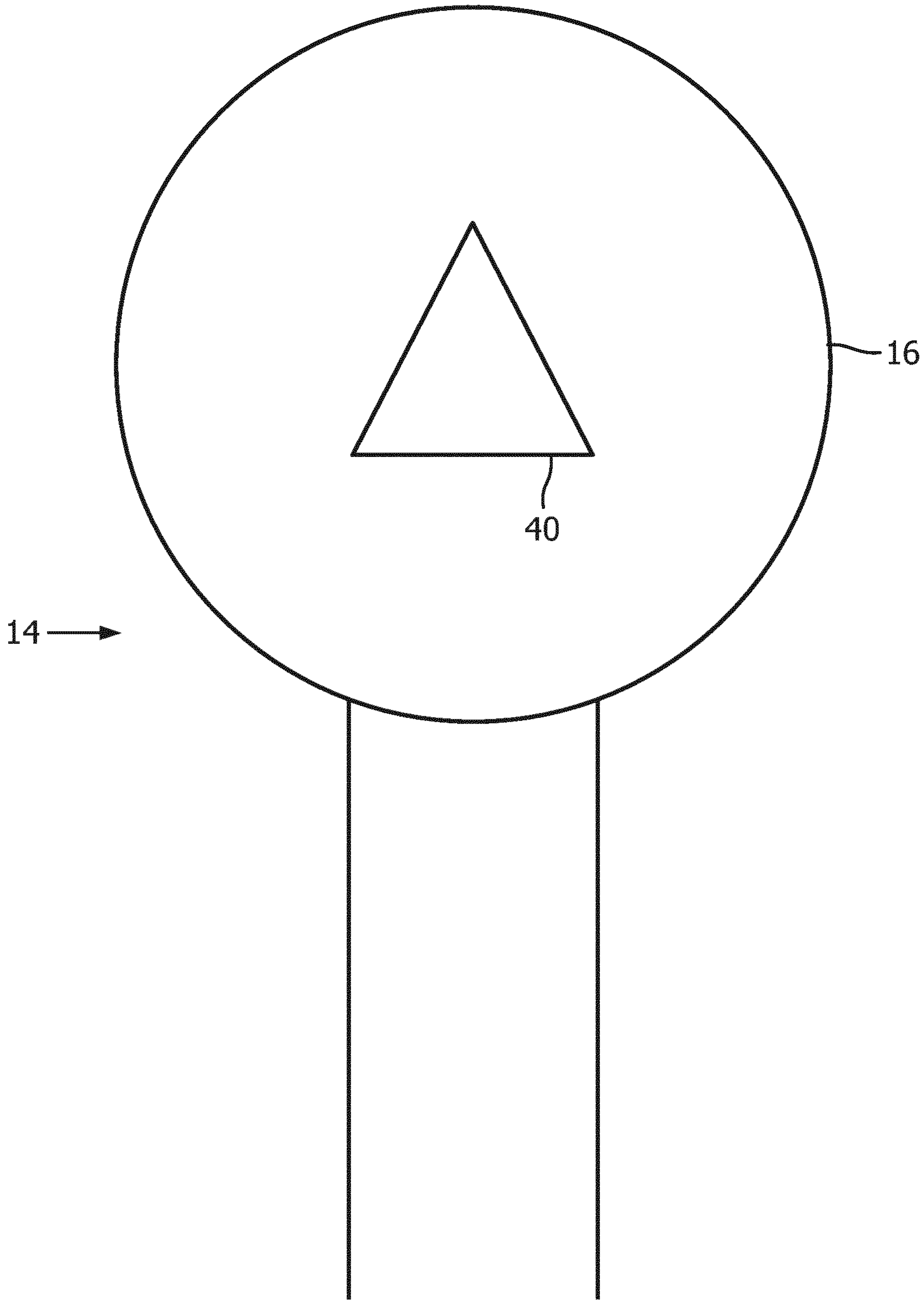
FIG. 5B is a schematic representation of a head of a cleaning device, in accordance with an embodiment.

Referring to FIG. 5B, in one embodiment, is a nozzle 14 of a personal care cleaning device comprising a nozzle head 16 with a triangular orifice 40. Due to the shape of the orifice and the liquid dynamics associated with the shape, triangular orifice 40 emits both liquid sheets and liquid jets. According to an embodiment, triangular orifice 40 can be produced from a plate or other component. For example, the triangular orifice 40 may comprise a 0.38 $mm^2$ area and a length (thickness) of 0.2 mm, although many other sizes and shapes are possible. For example, the triangular or star-shaped orifice may comprise an area of 0.1 to 2 $mm^2$, although many other sizes and shapes are possible.

Figure 6:
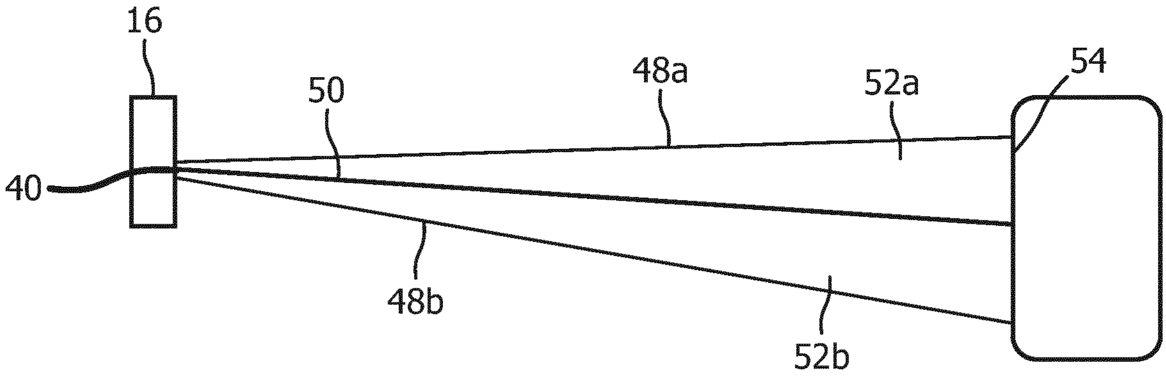
FIG. 6 is a schematic representation of liquid emitted from a head of a cleaning device, in accordance with an embodiment.

Referring to FIG. 6 is a side view of pressurized liquid ejecting from orifice 40 of the cleaning device of FIG. 5B. According to an embodiment, the orifice results in: (i) three outer liquid jets 48*a* and 48*b* as well as a third obscured outer jet (not shown); (ii) a thicker central jet 50; and (iii) three sheets extending approximately between the inner jet 50 and each of the outer jets. Two of the three sheets 52*a* and 52*b* are shown in FIG. 6. In this figure, the jets and streams are impacting a surface 54, which may be a dental surface, a wound, skin, and other surfaces. According to an embodiment, the sheets may be approximately 2-3 mm long and may comprise a varying width, mostly below 0.1 mm, although other shapes and sizes are possible. According to an embodiment, central jet 50 is non-circular.

Figure 7:
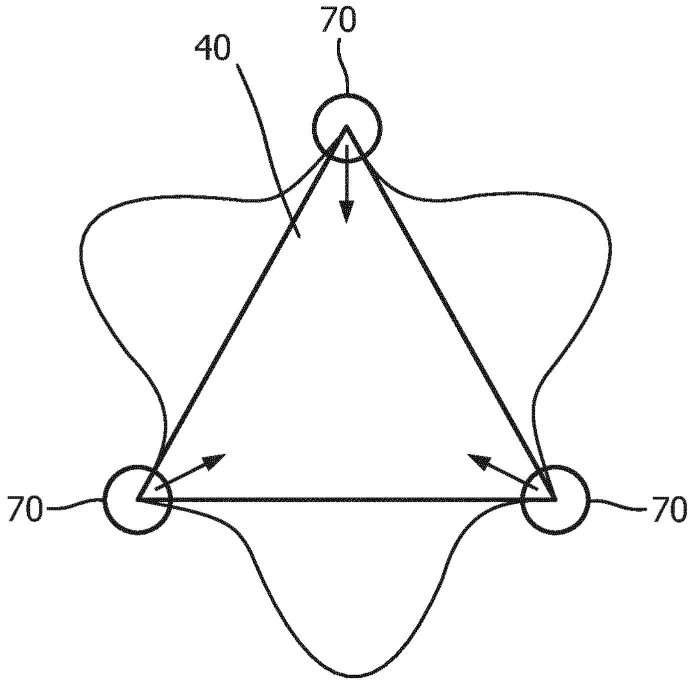
FIG. 7 is a schematic representation of fluid exiting from a triangular orifice of a cleaning device, in accordance with an embodiment.

Referring to FIG. 7 is a schematic representation of fluid exiting from a triangular orifice 40, such as the orifice shown in FIG. 5. Numerical computational fluid dynamics (CFD) modelling shows a singularity 70 present at the corners of the triangular shape. Due to mass conservation effects, this induces a flow separation at these points and an inward motion of fluid from the corners towards the center of the shape. This inward motion and the fluid separation results in the formation of the sheets and the creation of a central jet. According to an embodiment, the rim of the sheets might also form small jets or jet-like shapes.

Figure 8:
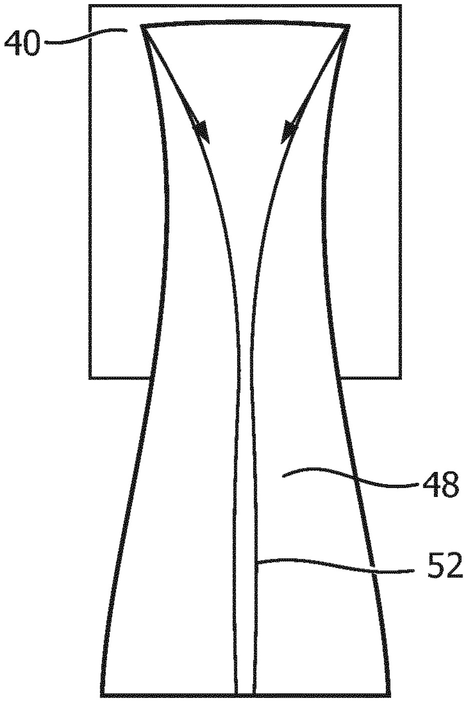
FIG. 8 is a schematic representation of a side view of fluid exiting from a triangular orifice of a cleaning device, in accordance with an embodiment.
Figure 9:
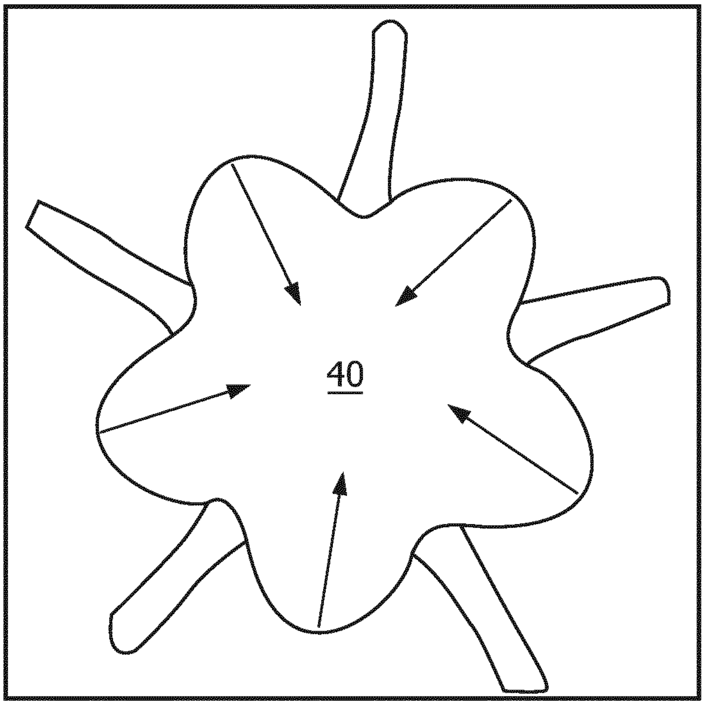
FIG. 9 is a schematic representation of fluid exiting from a star-shaped orifice of a cleaning device, in accordance with an embodiment.

Referring to FIG. 8 is a schematic representation of a side view of fluid exiting from a triangular orifice 40, such as the orifice shown in FIG. 5. According to an embodiment, two jets (shown by arrows) moving inwards from the corners meet each other in the middle and give origin to the liquid sheets 52 as well as outer jets 48. Similarly, referring to FIG. 9 is a schematic representation of fluid exiting from a star-shaped orifice 40. As shown in FIG. 8, two or more jets moving inward from the corners impact each other and give origin to liquid sheets as well as outer jets.

According to an embodiment, the thickness and/or length of the liquid sheets is dependent upon and/or affected by one or more geometric parameters of the shape of the orifice. Each shape might have specific parameters associated to it. For example, the number of sheets may depend on the number of vertices of the shape, while the thickness and/or outward length of the sheets may depend on the angle at the corners. However, there may also be geometrical constraints that limit the type of shape that can be generated. For example, the sum of angles of a triangle is 180 degrees. According to an embodiment, for some uses on-symmetrical shapes would be less preferred, such as scalene triangles, as they would apply a rotational restriction rather than being rotationally independent.

According to another embodiment, the length of the shaped orifice may be varied to affect the size, shape, and/or number of sheets emitted by the orifice. For example, the orifice may be formed in a material comprising a thickness of approximately 0.2 to 0.5 mm, which provides at the orifice inlet a jump from large diameter to the small orifice size, which appears to be beneficial for sheet formation. However, other thicknesses are possible.

According to another embodiment, other orifice shapes that could be used are rectangular or pentagonal orifices, among others. These shapes produce sheets, but not as long as the triangular nozzles due to the larger angles. Accordingly, 4- and 5-point star nozzles may be preferred for obtaining longer sheets. The pointiness of these shapes makes the angles smaller and the sheets longer.

Figure 10:
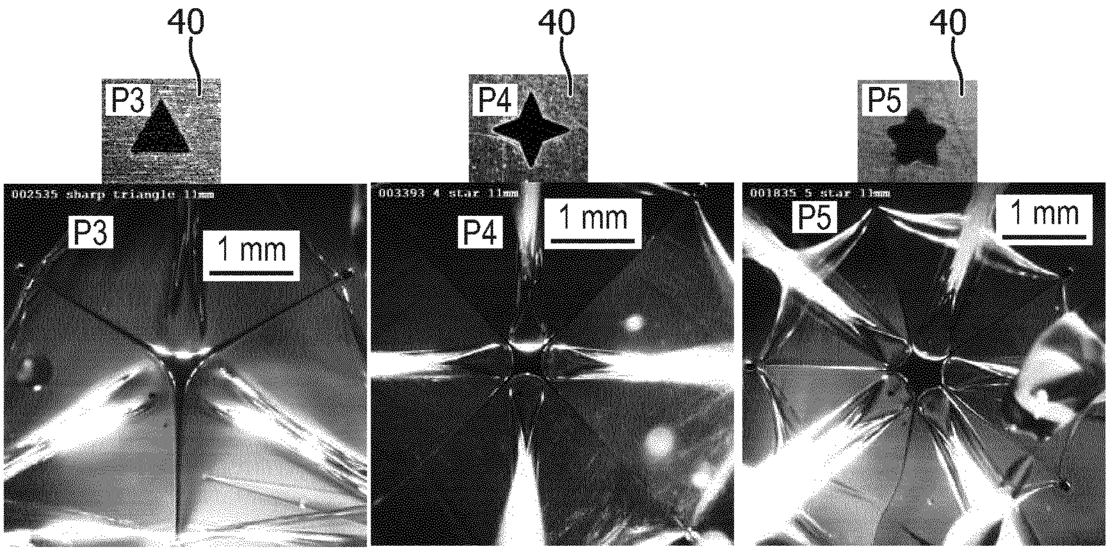
FIG. 10 is a series of images of shaped orifices for a cleaning device, and their fluidic impact shape at a surface at 11 mm distance from these orifices, in accordance with an embodiment.

Referring to FIG. 10 is a comparison of three different shapes for orifice 40, including a triangular shape P3, a 4-pointed star shape P4, and a 5-pointed star shape P5. In this comparison, the 4-pointed star shape P4 results in the longest extending sheets.

According to an embodiment, the lower panels P3, P4, and P5 in FIG. 10 depict the impact of a liquid from the corresponding orifice 40 onto a surface. The dark pattern is the direct impact of the jet-sheets profile, and the lighter colored areas are laterally outflowing jets focused by the outflow of two sheets. The sheet number is equal to the number of points. The central jet has the size of the shape with the extending points cut off, while each sheet has the area equivalent to one point.

Figure 11:
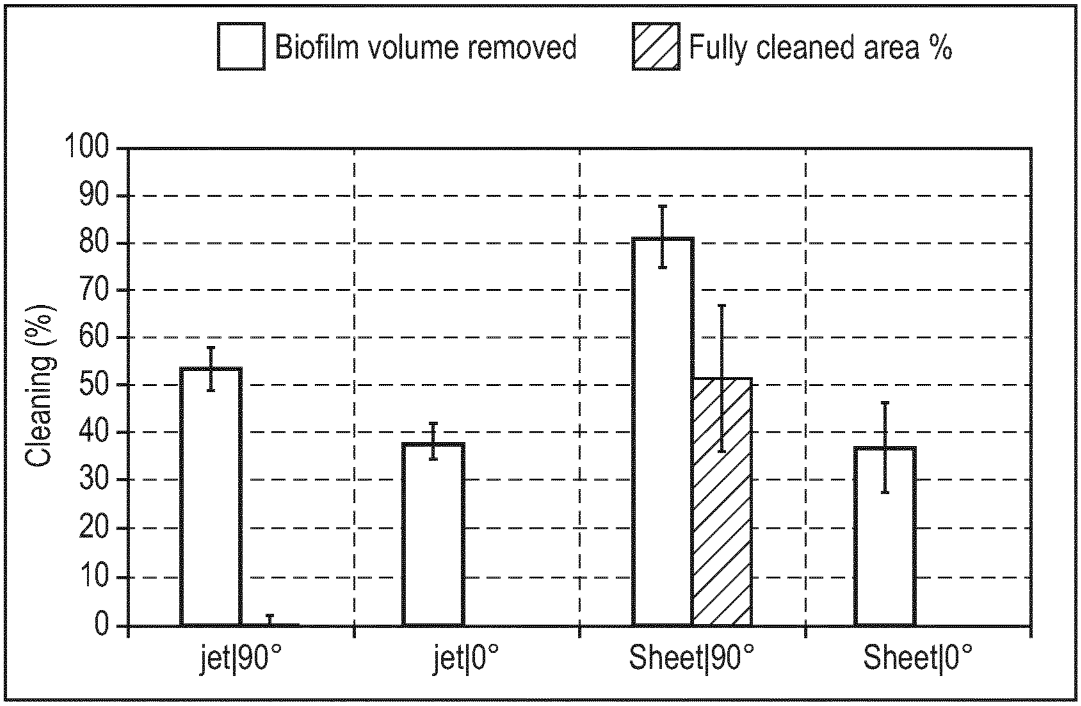
FIG. 11 is a graph of the results of biofilm removal for a round jet versus liquid sheet, in accordance with an embodiment.

As shown in FIG. 11, the effect of orifice shape on cleaning biofilm from tooth surfaces was examined. A round jet was compared to a single sheet for the effectiveness of removal of biofilm from a perpendicular (90° impact) or parallel (0° impact) to the biofilm.

The biofilm was treated with the fluid streams for 10 seconds to treat the full surface either at 90° impact or at 0° impact. There were two fluid stream modes to test biofilm removal: (1) a single jet originating from an 0.7 mm round orifice, pressure P=1 bar (velocity ca 13 m/s); and (2) a single sheet originating from a V-groove elliptical nozzle, flowrate equivalent to 0.7 mm round nozzle, sheet angle 110°, P=1 bar (velocity ca 12 m/s).

As shown in FIG. 11, the liquid sheet removes deeper biofilm layers significantly better than a jet at similar impact velocity (i.e., driving pressure) when operating perpendicularly. The effect is not found in this example at parallel impact. In the figure, the white bars show the percentage of biofilm volume removal while the shaded bars show the percentage of the area that is fully cleaned.

Figure 12:
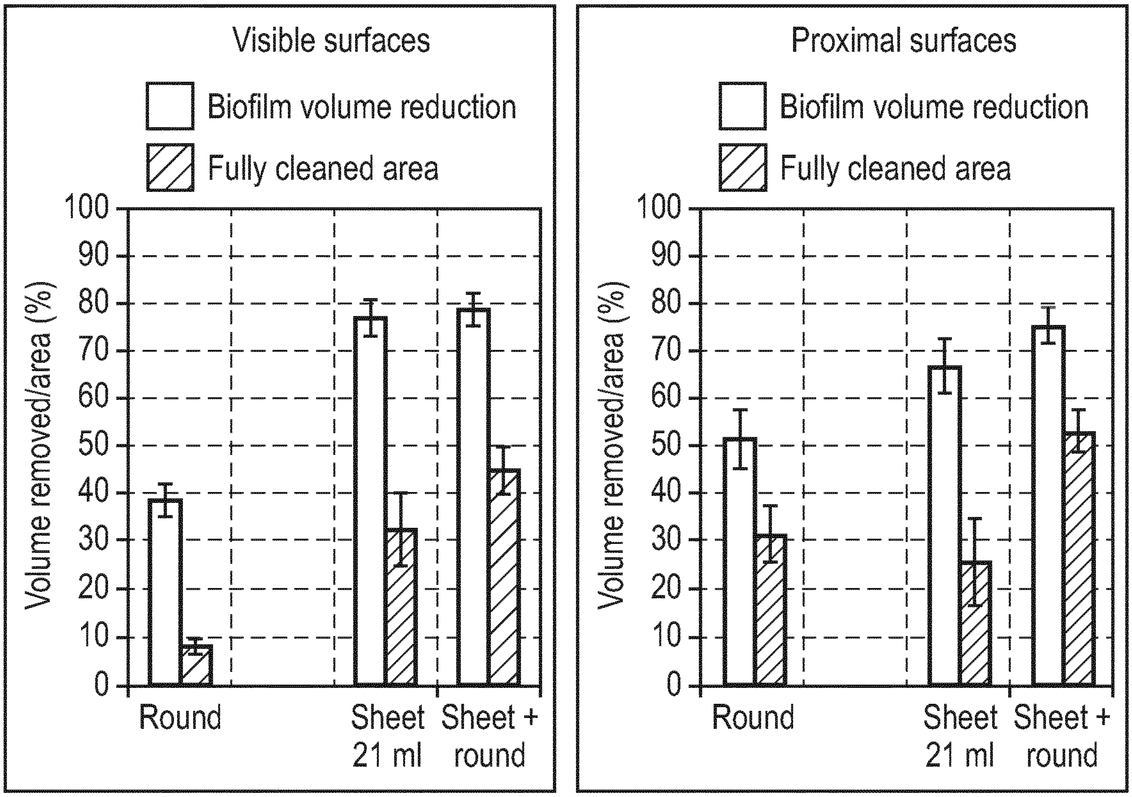
FIG. 12 is a graph of the results of biofilm removal from a tooth surface for a round jet versus liquid sheet, in accordance with an embodiment.

As shown in FIG. 12, the effect of orifice shape on cleaning was examined using tooth-shaped surfaces comprising a biofilm.

The biofilm was treated from both the buccal and the lingual sides with the fluid streams that moved over the lower part of the teeth (i.e., alongside the gum margin) at 5 mm distance from the outer part of the teeth. Both fast and normal movement speed was chosen to represent a total treatment volume in the oral cavity of 42 ml (in the case of the single sheet 21 ml as it was combined later with a jet to get to the total 42 ml). The driving pressure was in all cases 7.4 bar (ca 38 m/s).

Two fluid stream modes were used to test biofilm removal: (1) a single jet originating from an 0.7 mm diameter (0.38 $mm^2$ area) round hole in 0.2 mm thick plate; and (2) a single sheet originating from a V-groove nozzle having a 0.38 $mm^2$ area and 25° sheet angle. Biofilm removal was measured using image analysis, and the sheet-containing treatments had more cleaned area at the sides of the images, namely the outside visible tooth surfaces where the fluid hit the biofilm at steep angles. At the interproximal area the removal depth was similar for the jet and sheet, but addition of the sheet has the advantage over the round jet alone to have a larger treatment height, covering the full tooth height. Next to the deeper cleaning at steep impact, this is another advantage of the addition of a sheet to the cleaning fluid.

Still referring to FIG. 12, a graph of cleaning results for a round jet versus liquid sheet is shown. For this graph, image analysis determined the percentage of biofilm volume removed and the percentage cleaned area. The model teeth were impacted with 42 ml for a full mouth (21 ml for sheet only), separate for the visible outside of the tooth surfaces and the interproximal parts of the surface. On the visible surfaces, adding a sheet in the treatment obtained significantly more cleaned area and total biofilm volume removed than the round jet alone. The addition of the round jet to the single sheet did not statistically change cleaning on the visible surfaces. Interproximally, the sheet only treatment did not outperform the round jet on cleaned area percentage. However, due to the larger treatment height the sheet still won on total volume reduced. Notably, adding a jet to the sheet significantly increased cleaned area on the proximal surfaces, showing that the combination of a sheet and a jet is a possible embodiment providing superior cleaning on all tooth surface areas both in terms of biofilm volume reduction and cleaned surface area. In the graph, the white bars represent the total percentage of biofilm volume removed, and the shaded bars represent the area that was fully cleaned.

Figure 13:
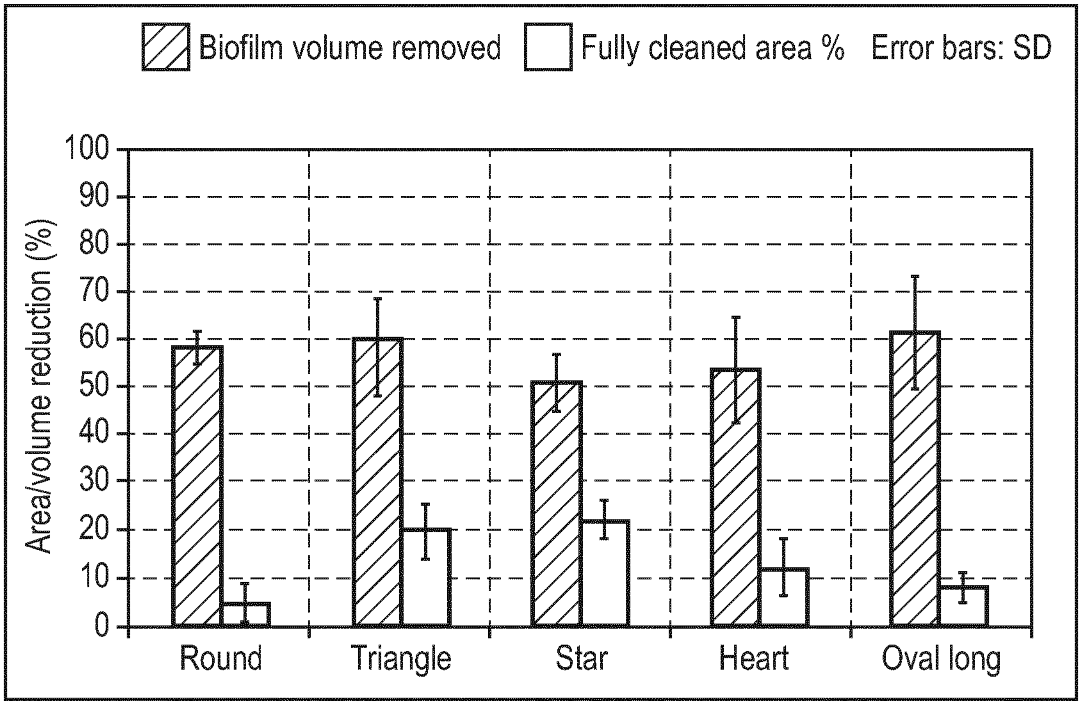
FIG. 13 is a graph of the results of biofilm removal for a round jet versus other orifice shapes, in accordance with an embodiment.

As shown in FIG. 13, the effect of orifice shape on cleaning was examined using a flat surface comprising a biofilm. A round jet was compared to oval, triangular, rounded five-point star, and heart shaped orifices for removal of biofilm from a flat plate perpendicular (90° impact) or parallel (0° impact) to the biofilm. Notably, the round and oval orifices do not produce liquid sheets, as described herein. The biofilm was treated with the fluid streams for 0.1 second at a single position 90° impact and 14 mm distance at a driving pressure of 3 bar.

Still referring to FIG. 13, the graph shows cleaning results for a round jet versus the other orifice shapes. Both the triangle and star shaped nozzles result in increased cleaned percentages when compared to a round or oval jet, showing that the sheets lead to a deeper biofilm removal.

Figure 14:
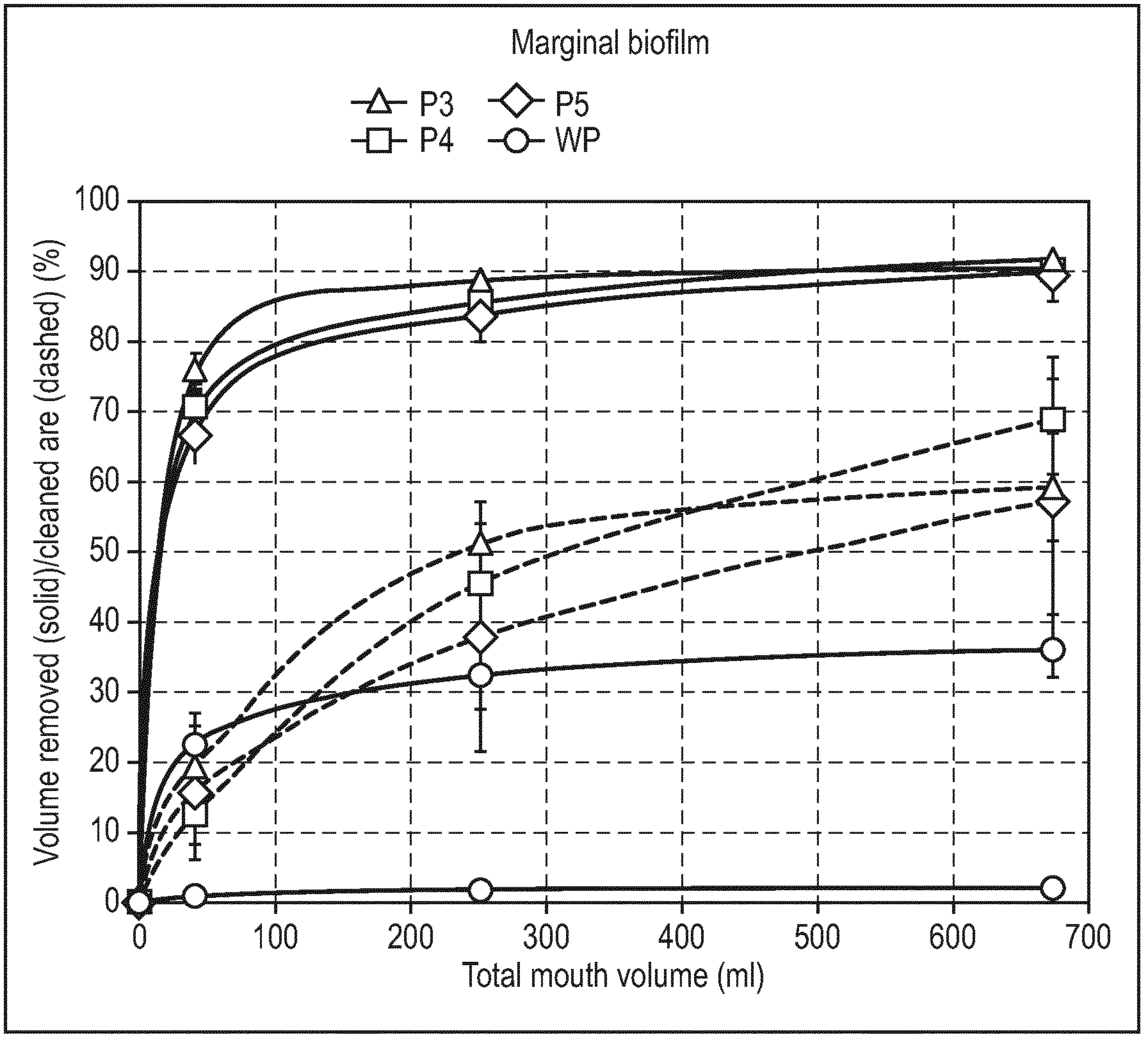
FIG. 14 is a graph of the results of biofilm removal for a round jet versus other orifice shapes, in accordance with an embodiment.

FIG. 14. shows the effect of orifice shape on cleaning was examined using tooth-shaped surfaces comprising a biofilm. A round jet was compared to flat plate nozzles having 3, 4, or 5 points at similar impact pressures. The biofilm was treated from the buccal side with the fluid streams that moved over the lower part of the teeth (alongside the gum margin). Fast, intermediate and slow movement speed was chosen to represent a total treatment volume in the oral cavity of 42, 254 or 674 ml, respectively. The driving pressure was in all cases 7.6 bar. The biofilm surfaces were imaged before and after treatment and the biofilm removal was measured using image analysis.

Still referring to FIG. 14, the graph shows cleaning results for flat plate nozzles with 3 ("P3"), 4 ("P4"), and 5 ("P5") points versus a traditional round oral irrigator ("WP") with a round orifice. Shown in the graph is the volume of biofilm removed from the gum margin at the buccal parts of the teeth (in solid lines) and the area cleaned in percentages (in dashed lines) for the four different orifice types. As shown in the graph, all point nozzles (which were jet-sheet combinations) achieved very effective cleaning, removing up to 90% of the biofilm and achieving over 50% fully cleaned area. The traditional oral irrigator nozzle employing only a round jet had difficulty in removing this strong biofilm, not even achieving 40% biofilm cleaning and having virtually no fully cleaned area.

Accordingly, the data shows that orifices comprise points, such as triangular and star-shaped orifices, produce jet-sheet combinations which are very effective in removing biofilm. Furthermore, when using nozzles with multiple radial sheets, the treatment height is relatively independent of rotation, making the cleaning result less dependent on user variables.

According to an embodiment, the fluid force of a liquid sheet must exceed the cohesion and adhesion forces of the biofilm. Accordingly, an optimal parameter window of the sheets is needed for the following two main requirements: (i) maximize the cleaning driver to equal the pressure gradient; and (ii) reach all target locations in the required amount of time.

According to an embodiment, several possible parameters for determining the pressure gradient are possible, including but not limited to the peak impact pressure $P_{peak}$ (related to impact velocity as $P=0.5\ \rho v^2$), the thickness of the sheet(s), and the impact angle. Several possible parameters for the reach and treatment time are possible, including but not limited to the treatment time, the sheet length, and the sheet pattern including positioning and number.

Referring to Table 1, below, are possible parameter windows for the liquid sheets according to an embodiment as described or otherwise envisioned herein. Although these parameters are provided, it should be recognized that other parameter windows are possible depending on, for example, the size and/or shape of the orifices and liquid sheets, among other factors.

TABLE 1

Possible parameter windows, including both optimal and extended, for cleaning.

| Parameter | Optimal | Extended |
|---|---|---|
| Peak impact pressure ($P_{peak}$) | 7-10 bar | 2-14 bar |
| Peak impact velocity | 37-45 m/s | 20-53 m/s |
| Sheet thickness | 10-60 micrometer | 5-200 micrometer |
| Impact angle | 60-90° | 0-90° |
| Treatment time = pressure pulse time where P > 0.8 $P_{peak}$ | >5 ms | >2 ms |
| Sheet length | 3-6 mm | 1-10 mm |
| Sheet position | Radial | At will |
| Sheet number | 3-5 | 1-8 |

According to an embodiment, the peak impact pressure P or impact velocity v parameter is the main driver of cleaning as it determines the level of pressure gradient as well as shear stresses seen by the biofilm.

According to an embodiment, regarding the sheet thickness parameter, thin sheets remove deeper than thick ones, but if the sheets are too thin, the force decreases if the liquid film passing over the biofilm becomes thinner than the biofilm colonies. For example, thinning down from 16 μm to 11 μm in in vitro experiments showed reduced efficacy of steep impact removal. According to an embodiment, the optimal sheet thickness may be in the range 10-60 μm, although many other ranges are possible.

According to an embodiment, regarding the impact angle parameter, at a steep impact such as up to 60°, the pressure gradient for sheets is highest, while the pressure gradient drops with decreasing impact angle. Sheets at steep angles may clean much deeper than jets, but at shallow angles cleaning with sheets may become less efficient. According to an embodiment, therefore, thin sheets can be combined with a larger round jet to maintain cleaning efficacy at shallow impact.

According to an embodiment, regarding the treatment time parameter, experiments showed that most of the removal close to the impact zone occurs in the first 2 to 4 ms, depending on the angle. Accordingly, additional momentum and/or water volume may have little or no influence on the remaining biofilm.

According to an embodiment, regarding the sheet length parameter, with a multitude of radial sheets most of the tooth height can be covered using 3 to 6 mm long sheets, so the user can clean everything with a single line movement. Smaller sheets may restrict the cleaning to the gum margin and interproximal areas only, for example, which may be sufficient to improve gum health. Longer sheets may suitably clean, but having sheets longer than 10 mm may waste liquid since a large part of the sheets may miss the teeth.

According to an embodiment, regarding the sheet position and number parameter, radial sheet configurations such as triple, cross and star may be utilized as they give rotation freedom to the user. More than five sheets may become too crowded if the sheets hamper each other. According to an embodiment, radial sheet positioning may provide an advantage over a ring shape in that it produces extending radial lateral jets which may clean in secondary locations such as subgingival pockets.

According to an embodiment, pressure dynamics such as pulsations or continuous emission may not influence the efficacy of cleaning, although sheet instabilities such as ripples or oscillations in the sheet may improve efficacy.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A personal care cleaning device comprising:

a body portion;

a source of pressurized air;

a nozzle member mounted on the body portion and comprising a nozzle head, wherein the nozzle head is not a mouthpiece, and wherein the nozzle member is configured to allow passage of a liquid from a reservoir in the body portion to the nozzle head; and a first orifice in the nozzle head configured to allow the liquid to exit the nozzle head, wherein the first orifice is located at an end remote from the body portion, and wherein the first orifice and the source of pressurized air are both configured to shape the exiting liquid into at least one liquid sheet such that the at least one liquid sheet has a length of between 5 to 10 mm at the position of impact on a surface to be cleaned and a width of less than 0.1 mm at a position of impact on the surface to be cleaned and has a peak impact pressure of 2 to 14 bar;

wherein the at least one liquid sheet has an impact angle between 0° and 90° relative to the surface to be cleaned that is adjustable as the personal care cleaning device is moved across the surface to be cleaned.

2. The cleaning device of claim 1, further comprising a second orifice in the nozzle head configured to allow the liquid to exit the nozzle head, wherein the second orifice is circular.

3. The cleaning device of claim 1, wherein the first orifice is configured to shape the exiting liquid into a plurality of liquid sheets, each of the plurality of liquid sheets extending outwardly from a centralized liquid jet.

4. The cleaning device of claim 1, wherein the first orifice is configured to shape the length of the one or more liquid sheets to be between approximately 2 to 15 mm at the position of impact on the surface to be cleaned.

5. The cleaning device of claim 1, wherein the nozzle head further comprises one or more additional orifices, wherein the first orifice and the one or more additional orifices each comprise a different shape.

6. The cleaning device of claim 1, wherein the nozzle member is removably mounted on the body portion.

7. The cleaning device of claim 1, wherein the personal care cleaning device is an oral irrigator.

8. The cleaning device of claim 1, wherein the first orifice and the source of pressurized air are both configured to shape the exiting liquid into at least one liquid sheet such that the at least one liquid sheet has a peak impact velocity of 20 to 53 m/s.

9. The cleaning device of claim 1, wherein the at least one liquid sheet has a length-to-width ratio between 5 and 2000.

10. A cleaning device comprising:

a body portion;

a source of pressurized air;

a nozzle member mounted on the body portion and comprising a nozzle head, wherein the nozzle head is not a mouthpiece, and wherein the nozzle member is configured to allow passage of liquid from a reservoir in the body portion to the nozzle head; and a first orifice in the nozzle head configured to allow the liquid to exit the nozzle head, wherein the first orifice is located at an end remote from the body portion, wherein the first orifice is rectangular, triangular, or star-shaped, and wherein the first orifice and the source of pressurized air are both configured to emit both a jet of liquid and a sheet of liquid such that the liquid sheet has a length of between 5 to 10 mm at the position of impact on a surface to be cleaned and a width of less than 0.1 mm at a position of impact on the surface to be cleaned and has a peak impact pressure of 2 to 14 bar;

wherein the liquid sheet has an impact angle between 0° and 90° relative to the surface to be cleaned that is adjustable as the personal care cleaning device is moved across the surface to be cleaned.

11. The cleaning device of claim 10, wherein the first orifice is only star-shaped and comprises 3, 4, 5, or 6 points.

12. The cleaning device of claim 10, further comprising a second orifice in the nozzle head configured to allow the liquid to exit the nozzle head, wherein the second orifice is circular.

13. The cleaning device of claim 10, wherein the first orifice is only star-shaped orifice and comprises an area of approximately 0.1 to 2 $mm^2$.

14. The cleaning device of claim 10, wherein the nozzle member is removably mounted on the body portion.

15. The cleaning device of claim 10, wherein the personal care cleaning device is an oral irrigator.

16. The cleaning device of claim 10, wherein the first orifice and the source of pressurized air are both configured to emit both a jet of liquid and a sheet of liquid such that the liquid sheet has a peak impact velocity of 20 to 53 m/s.

17. The cleaning device of claim 10, wherein the sheet of liquid has a length-to-width ratio between 5 and 2000.

* * * * *